(12) United States Patent
Zaidi et al.

(10) Patent No.: US 12,401,300 B2
(45) Date of Patent: Aug. 26, 2025

(54) DETERMINISTIC CONTROL OF SENSOR BASED MOTOR

(71) Applicant: Cypress Semiconductor Corporation, San Jose, CA (US)

(72) Inventors: Taskeen Zaidi, Munich (DE); Ketan Dewan, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 200 days.

(21) Appl. No.: 18/455,343

(22) Filed: Aug. 24, 2023

(65) Prior Publication Data

US 2025/0070693 A1 Feb. 27, 2025

(51) Int. Cl.
*H02P 27/12* (2006.01)
*H02P 6/16* (2016.01)
*H02P 23/00* (2016.01)

(52) U.S. Cl.
CPC ............ *H02P 6/16* (2013.01); *H02P 23/0077* (2013.01)

(58) Field of Classification Search
CPC ......... H02P 27/12; H02P 6/16; H02P 23/0077
See application file for complete search history.

(56) References Cited

U.S. PATENT DOCUMENTS

| | | | |
|---|---|---|---|
| 7,274,163 B1 * | 9/2007 | Lambert | H02P 23/0004 318/610 |
| 2014/0035495 A1 * | 2/2014 | Kim | H02P 27/12 318/400.17 |

* cited by examiner

*Primary Examiner* — Cortez M Cook

(57) ABSTRACT

An electronic circuit may be configured to obtain an input including one or more hall sensor readings, determine a current motor position based on the input and a first lookup table, determine a desired motor position based on the first lookup table on the current motor position, determine a pulse width modulation (PWM) commutation pattern based on the desired motor position and a second lookup table, and output the PWM commutation pattern within a predetermined time from obtaining the input.

20 Claims, 6 Drawing Sheets

DETERMINISTIC CONTROL OF SENSOR BASED MOTOR

TECHNICAL FIELD

Aspects of the present disclosure relate to motor control, and more particularly, to a deterministic sensor-based motor controller.

BACKGROUND

An electric motor is generally a machine that converts electrical energy into mechanical energy, typically in the form of rotational movement. A motor may include a rotor and a stator. The rotor is a rotating component, typically including coils of wire or permanent magnets, while the stator is a stationary component that typically contains the coils of wire that produce the magnetic field. A variety of different motor designs exist. Generally, when an electric current is passed through the coils of wire in the stator, the passing of the current through the coils creates a magnetic field that interacts with the magnetic field of the rotor, causing the rotor to rotate.

Electric motors are used for various applications, including transportation (e.g., to turn wheels or turbines). The speed and torque of a motor may be controlled by controlling the pattern of electric current or voltage to the motor.

BRIEF DESCRIPTION OF THE SEVERAL VIEWS OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
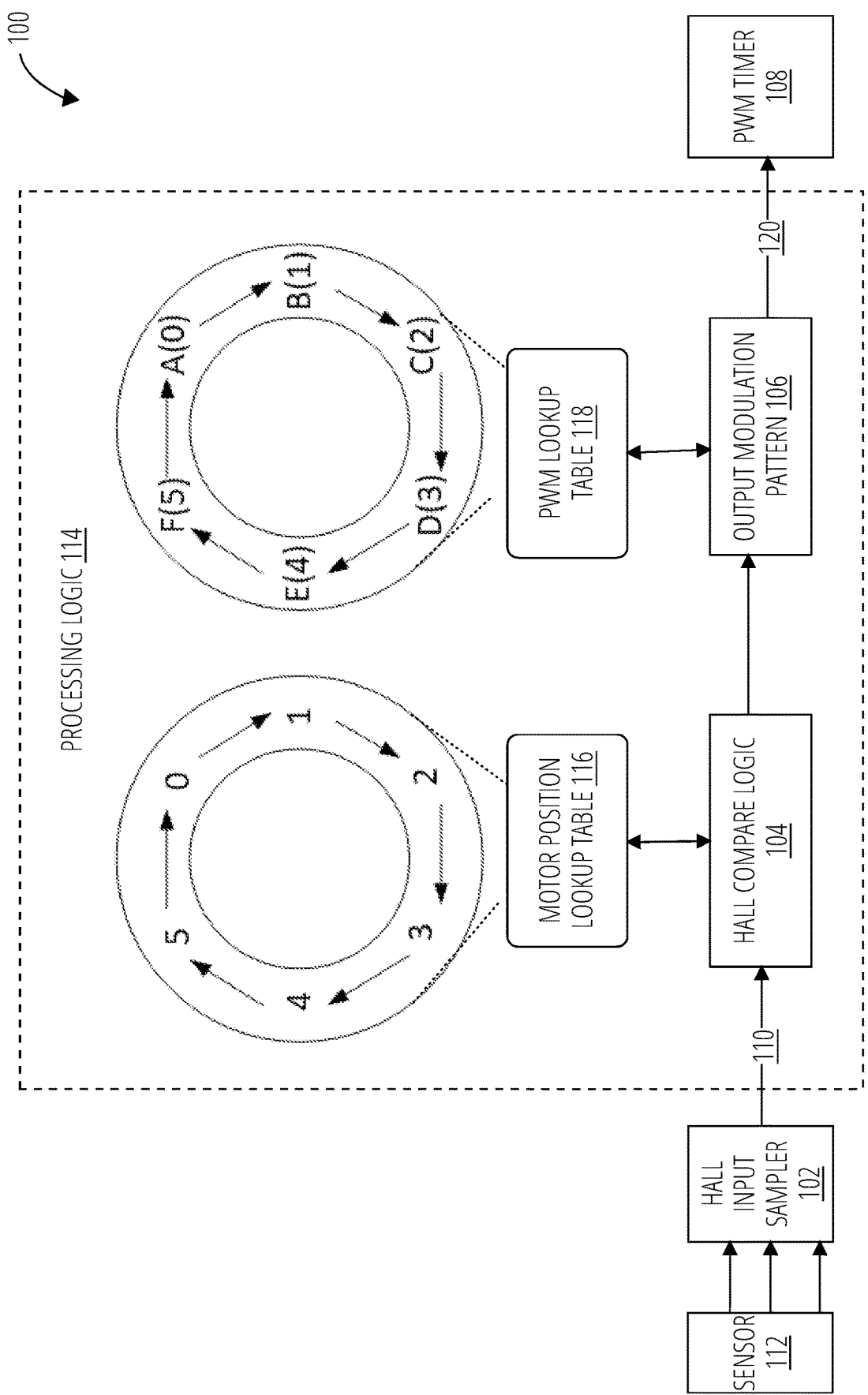
FIG. 1 shows a hardware-based motor control system for pulse-width modulated (PWM) control of a motor, in accordance with some embodiments.

Examples of various aspects and variations of the subject technology are described herein and illustrated in the accompanying drawings. The following description is not intended to limit the invention to these embodiments, but rather to enable a person skilled in the art to make and use this invention.

Controlling an electric motor involves managing the electrical energy that powers the motor to achieve the desired motion (e.g., a desired speed, direction, torque, or position). The control of an electric motor may be achieved through the use of an electronic device, such as a motor controller or driver, which regulates the amount of electrical energy supplied to the motor.

Methods for controlling an electric motor include variable frequency drives (VFDs), pulse width modulation (PWM), and direct current (DC) voltage control. Electric motor control using pulse width modulation (PWM) regulates the speed or torque of an electric motor using PWM signals. PWM involves sending a series of high-frequency pulses (PWM signals) to the motor. Each PWM signal may be applied to a gate drive circuit that controls current flow to through a power circuit (e.g., ON when the PWM signal is high, and OFF when the PWM signal is low). The power circuit ultimately connects to an electromagnetic circuit of the motor. The energized electromagnetic circuit of the motor may exert a force on a rotor of the motor to give the motor a desired force, thereby moving the motor in a desired direction. Different PWM control patterns may be generated and changed over time depending on the motor type or the presently sensed position of the motor, to continuously move the motor to a desired position. Electrical and electronic circuits (e.g., power topologies, gate drive circuits, etc.) may vary depending on application requirements, the type of motor (e.g., brushless DC motor (BLDC), three-phase AC motors, etc.), etc.

By regulating the amount of power supplied to the motor, PWM systems can maintain a constant speed even under varying loads, reducing the need for mechanical speed regulators. PWM motor control provides a powerful and flexible method for regulating the speed and torque of electric motors. PWM control, however, relies on a fast calculation of the current motor position to repeatedly provide an updated PWM signal, in order to provide a PWM modulation pattern to drive the motor to its next desired position.

Sensor based motor control utilizes a dedicated position sensor to infer motor position. For example, Hall sensors arranged strategically on a motor may be used to sense a motor position. Sensor outputs may be provided to an input of a microcontroller unit (MCU) and an interrupt may be generated to a central processing unit (CPU) of the MCU. The interrupt may be raised on each input event, causing the CPU to react to each interrupt, read the current position of the motor based on the hall position input, and update the PWM characteristics based on the hall input, for the next PWM cycle. This may CPU interrupt may unnecessarily hamper operation of the CPU which may also be responsible for performing a number of other tasks. Further, depending on the architecture of the CPU, this process may not be deterministic. That is, the CPU may not be relied upon to react within a predetermined time (e.g., within 'x' ms).

Aspects of the present disclosure include a hardware-based system configured to: obtain an input comprising one or more hall sensor readings, determine a current motor position based on the input and a first lookup table, determine a desired motor position based on the first lookup table on the current motor position, determine a pulse width modulation (PWM) commutation pattern based on the desired motor position and a second lookup table; and output the PWM commutation pattern within a predetermined time from obtaining the input. The hardware-based system may comprise an electric circuit (e.g., having active and passive electronic components) interconnected to perform the operations described. Such components may include transistors, comparators, memory devices (e.g., registers), power supplies, and other electronic components. The hardware-based system may be deterministic.

The hardware-based system may operate separate from a CPU to determine the PWM commutation pattern for each PWM cycle without interrupting the CPU.

In one embodiment, the system may further detect that the current motor position is in fault in response to the current motor position not matching a criterion or multiple criteria. For example, in response to the current motor position not matching any of a previously sensed motor position, or a motor position that is adjacent to the previously sensed motor position, the system may determine that a fault occurred. In response, the system may output a fault signal (e.g., an interrupt) to a central processing unit (CPU) within the predetermined time, or output a safety PWM commutation pattern that is not included in the second lookup table, or both, within the predetermined time.

The system may be configurable through software (e.g., by a CPU). The system may include programmable memory (e.g., a register) that assigns a value to the safety PWM commutation pattern, so that software may provide a safety state of the PWM commutation pattern for a given application. Similarly, the system may include programmable memory that assign values to the first lookup table and the second lookup table, such as a first register and a second register, respectively.

In some examples, the PWM commutation pattern comprises six PWM outputs or more. In some examples, the PWM commutation pattern comprises eight PWM outputs.

In some examples, the first lookup table and the second lookup table are circular lookup tables. In some examples, they are also bi-directional lookup tables. Determining the desired motor position may include incrementing an index of the first lookup table to obtain the desired motor position. In some examples, the index is represented by a pointer. The first lookup table and the second lookup table may share a common pointer and index. Like the rest of the system, the lookup tables may be implemented as hardware (e.g., programmable registers).

In some examples, the system may include a PWM timer. For example, such a system may be integrated with a PWM timer on a system on chip (SOC) to provide an integrated motor control solution. In some examples, the system may be integrated with a microcontroller unit (MCU) that includes such a PWM timer. The PWM commutation pattern may be routed to the PWM timer, and the PWM timer outputs a plurality of PWM outputs according to the PWM commutation pattern. A PWM timer is a type of timer that generates a series of square waves (PWM signals) with variable duty cycles.

The system may comprise processing logic to support the described functionality. Processing logic may comprise hardware such as circuitry, dedicated logic such as one or more logic gates, programmable logic, passive electronic components, active electronic components, registers, and other electronic hardware.

FIG. 1 shows a hardware-based motor control system 100 for pulse width modulated (PWM) control of a motor, in accordance with some embodiments. The system 100 may include one or more sensors 112. One or more sensors 112 may comprise a plurality of Hall sensors (e.g., three Hall sensors) that are arranged strategically on the motor to capture a current position of a motor (e.g., a rotor position). A Hall sensor (also referred to as a hall effect sensor) detects the presence and magnitude of a magnetic field using the Hall effect. Depending on the reading of each hall sensor, and the position of each hall sensors relative to the rotor of a motor, the system 100 may determine the motor position.

Hall input sampler 102 may sample the inputs of each Hall sensor 112 and obtain a single reading from each of the hall input sensors 112 as a 'sample'. This sample input may be provided as input 110 to processing logic 114. The sample may represent the readings of each Hall sensor at a common time. Processing logic 114 may obtain input 110 comprising the sample of the one or more hall sensor readings.

At block 104, processing logic 114 may determine a current motor position based on the input and a first lookup table 116. For example, if input reading 110 comprises 'X,Y,Z', this may correspond to '2' in the first lookup table 116. First lookup table 116 may also be referred to as a motor position lookup table 116. Processing logic 114 may determine a desired motor position based on the first lookup table 116 on the current motor position. For example, processing logic 114 may increment a pointer from the current motor position (e.g., '2') to the next motor position (e.g., position '3') where the next motor position is the desired motor position. In some examples, the position of a motor may be represented by the index of each lookup table.

At block 106, processing logic 114 may determine a pulse width modulation (PWM) commutation pattern based on the desired motor position and a second lookup table 118. The second lookup table 118 may be referred to as a PWM lookup table 118. The PWM lookup table may include a unique PWM commutation pattern that corresponds to each position specified in lookup table 116. For example, a motor may be driven with the PWM commutation pattern at position '3' (which may correspond to index 3) of lookup table 118. This position '3' may correspond to position '3' of lookup table 116. The motor may be driven with the PWM commutation pattern at index 3 of lookup table 118 to a next position that is specified at index 3 of lookup table 116. Each of the indexes of PWM lookup table 118 may comprise a unique set of outputs, for example, index 2 of 118 may comprise six PWM signals (1, 0, 1, 0, 1, 0), index 1 may comprise (1, 1, 1, 0, 0, 0), and so on. The patterns may vary depending on the motor, the topology of the power stage, or other considerations.

Processing logic 114 may output the PWM commutation pattern 120. The operations described for a given input 110 may be performed within a predetermined time from obtaining the input. As such, processing logic 114 may be referred to as being deterministic-having a reliable hardware-based response time. In some examples, the PWM commutation pattern 120 comprises at least six PWM output signals. In some examples, the PWM commutation pattern comprises eight PWM output signals. In various other embodiments, more or fewer than six or eight PWM output signals may comprise the PWM commutation pattern.

At block 104, processing logic may detect that the current motor position is in fault in response to the current motor position by comparing the current sensed motor position (provided by input 110) to the previously sensed motor position, or a motor position that is adjacent to the previously sensed motor position. For example, if the previous and last sensed motor position was '5', processing logic may check to see if the presently sensed motor position is the same as '5' or '4', or '0'. If the current motor position has stayed the same since the last position, this may indicate the motor did not move or did not move enough from the last position. If the motor position has moved forward one position, this may indicate that the motor moved to the expected motor position. If the motor position has gone backward one position, this may indicate that the motor position has switched direction. If the current motor position is none of these positions (e.g., '5', '4', or '0'), then processing logic may take this as an indication that a fault (e.g., a failure) has occurred. In response to detecting the fault, processing logic may output a fault signal (e.g., an interrupt) to a central processing unit (CPU), or output a safety PWM commutation pattern that is not included in the second lookup table, or both, within the predetermined time. The safety PWM commutation pattern may be a programmable pattern. For example, this safety pattern may be set through a register that is exposed to software (e.g., a CPU) to allow software to set a different 'safe state' for different applications.

Similarly, processing logic 114 may include programmable memory that assign values to the first lookup table 116 and the second lookup table 118, such as a first register and a second register, respectively. Software may program the respective lookup tables (LUTs) at initialization, or after a fault, or in response to a direction change. By exposing the programmable memory of the lookup tables, processing logic 114 provides a flexible solution that may be tailored to different applications.

In some examples, the first lookup table 116 and the second lookup table 118 are circular lookup tables. These lookup tables may also be bi-directional lookup tables-processing logic 114 may determine what motor position corresponds to a given hall input, or determine what hall input corresponds to a given motor position. Determining the desired motor position may include incrementing an index of the first lookup table to obtain the desired motor position. In some examples, the index is represented by a pointer. The first lookup table and the second lookup table may share a common pointer and index. Assuming that processing logic determines that the current motor position is as expected, processing logic may increment the index (moving the index to the directly next motor position in lookup table 116), while simultaneously incrementing the index at PWM lookup table 118.

At block 106, processing logic 114 may obtain the PWM output modulation pattern that is pointed to by the incremented index and provide this as the output 120. In some examples, output 120 includes a high/low indicator for each PWM signal for the upcoming PWM cycle. In other examples, output 120 may include a duty cycle for each PWM signal.

PWM timer 108 may receive the output 120 and output corresponding PWM signals, where the state of each signal (e.g., high or low) is as defined by the output 120. A duty cycle may be understood as the ratio of time that the waveform is high to the total time period of the waveform. PWM timer 108 may include a counter that generates a series of pulses at a fixed frequency, which is typically higher than the frequency of the desired output waveform. The duration of each pulse (i.e., the "on" time) may be controlled by a circuit that compares the value of the counter to a preset value called the "duty cycle". When the counter value is less than the duty cycle, the output of the circuit of PWM timer 108 goes high, and the output waveform is high. When the counter value is greater than the duty cycle, the output of the circuit of PWM timer 108 goes low, and the output waveform is low.

In some examples, processing logic 114 or hall input sampler 102, or both, may be integrated with a PWM timer 108 in a common housing (e.g., on a system on chip (SOC)) to provide an integrated motor control solution. In some examples, the system may be integrated with a microcontroller unit (MCU) in a common housing that includes such a PWM timer 108, processing logic 114, and hall input sampler 102.

Figure 2:
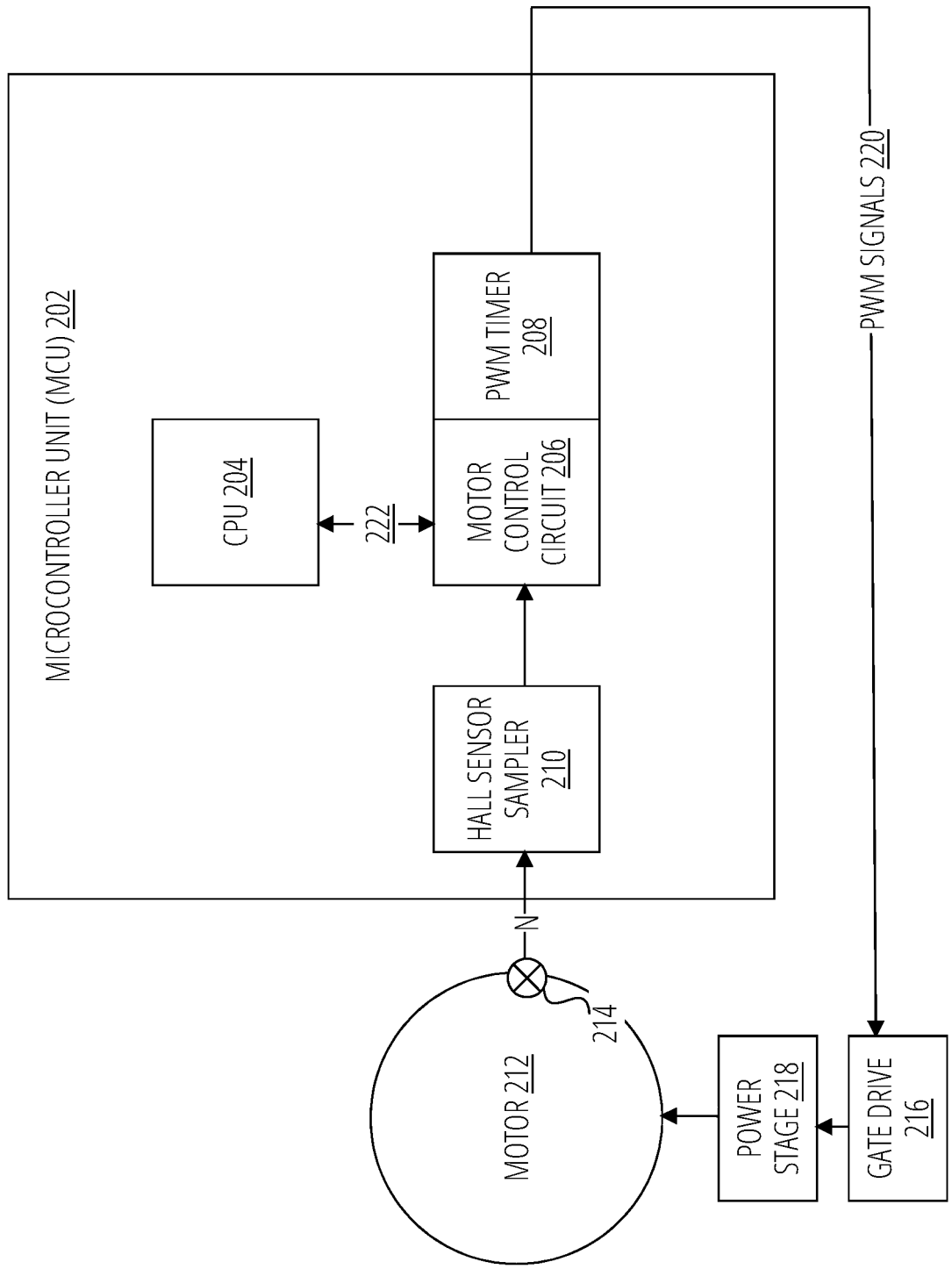
FIG. 2 shows an example of controlling a motor using a hardware-based solution, in accordance with some embodiments.

FIG. 2 shows an example of controlling a motor using a hardware-based solution, in accordance with some embodiments. Motor 212 may include various motor components such as a stator, a rotor, and electromagnetic circuits to cause movement of the rotor with electromagnetic force. Motor 212 may include hall sensors 214 that are arranged in one or more fixed positions to encode the position of the motor 212 using the Hall effect.

The sensor signals may be provided to a microcontroller unit (MCU) 202. The microcontroller unit (MCU) 202 may include a hall sensor sampler 210, a CPU 204, a motor control circuit 206, and a PWM timer 208. The sensor signals may be sampled at block 210 and provided as input to the motor control circuit 206.

Motor control circuit 206 may correspond to processing logic 114. Motor control circuit may include electronic components (e.g., non-CPU components) that are configured to perform the operations described with respect to processing logic 114. The motor control circuit 206 may take in the current sensed position of the motor 212, and determine an output modulation pattern with LUTs, as described. For example, motor control circuit 206 may utilize a first LUT to determine the current sensed position. If this current sensed position is deemed to be as expected, motor control circuit 206 may use a second LUT to determine the output modulation pattern that includes the state (or duty cycle) of each of a plurality of PWM signals.

This output modulation pattern from the motor control circuit 206 may be provided to PWM timer 208, which generates PWM signals 220 as defined by the output modulation pattern. Each of the PWM signals may drive a corresponding gate drive circuit 216. Each gate drive circuit may include one or more intermediate components (e.g., semiconductors, capacitors, resistors, etc.) that converts the PWM signals into a suitable driving signal. The driving signal may be coupled to power semi-conductors (e.g., MOSFETs, IGBTs, etc.) of a power stage 218 that 'open' or 'close' according to the driving signal and the state of the PWM signal. The topology of the power stage 218 may vary depending on the type of motor (e.g., a BLDC motor, an AC induction motor, etc.), efficiency, motor speed, or other considerations. Depending on the pattern of the PWM signals 220, the electromagnetic force generated from the power stage 218 to the motor 212 may pull or push the rotor of motor 212 to the desired position.

With such an architecture, CPU 204 may be relieved of the operations of determining PWM signals 220 based on the inputs from hall sensors 214. CPU 204 may perform other high-level operations. CPU 204 may perform various operations referred to herein as 'software'. One or more communication lines 222 may be present between CPU 204 and motor control circuit 206. CPU 204 may use these communication lines 222 to program settings in the motor control circuit 206, including programming the first or second LUTs of the motor control circuit 206 or programming a safety PWM pattern in case of fault. Motor control circuit 206 may also send one or more signals (e.g., an interrupt) to the CPU 204 through communication lines 222. Such signals may indicate if a fault is present, or that the motor 212 changed directions, or other conditions that the CPU 204 may be configured to respond to.

As described, the motor control circuit 206 may rely on hardware rather than software to analyze the hall input, and respond accordingly, either by generating a modulation pattern for the next desired motor position, or by generating a fault. In either case, the motor control circuit 206 may operate deterministically, within a predefined time, so that the timing of the response can be relied upon.

Figure 3:
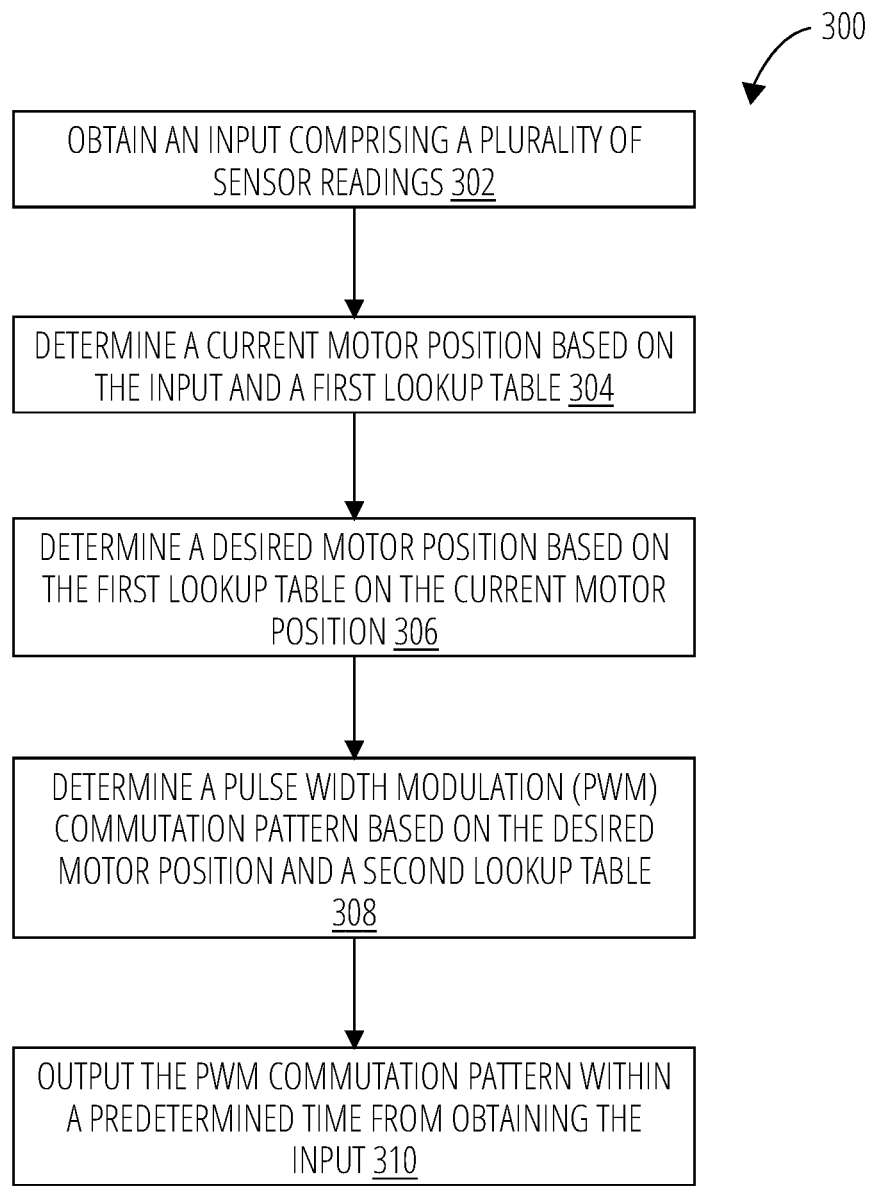
FIG. 3 illustrates an example method of a hardware-based motor controller with Hall sensor inputs, in accordance with some embodiments.

FIG. 3 illustrates an example method 300 of a hardware-based motor controller with Hall sensor inputs, in accordance with one embodiment. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some examples, processing logic may include a hardware-based solution and not a software-based solution (e.g., a CPU).

Method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

At block 302, processing logic obtains an input comprising one or more hall sensor readings. As discussed, the hall sensor readings may be sampled from hall sensors that are arranged to sense the magnetic field at a given position. Multiple readings captured simultaneously (at the same time) at different positions may be decoded to determine a position (e.g., a rotation) of the motor.

At block 304, processing logic determines a current motor position based on the input and a first lookup table. The first lookup table may map or decode the Hall readings to a given motor position. For example, the first lookup table may include a plurality of indices, each having a stored a combination of hall sense readings. The index may correspond to a position of the motor.

At block 306, processing logic determines a desired motor position based on the first lookup table on the current motor position. For example, if the current motor position matches the expected motor position, processing logic may increment a pointer of the first lookup table. This updated pointer may point to the new desired position of the motor, which may be the next motor position (relative to the pointer position prior to incrementing).

At block 308, processing logic determines a PWM commutation pattern based on the desired motor position and a second lookup table. For example, the same pointer incremented at block 306 may also point to a corresponding index at the second lookup table. Processing logic may take the commutation pattern stored in the second lookup table at that updated index position and use that as the PWM commutation pattern to obtain the desired motor position.

At block 310, processing logic outputs the PWM commutation pattern within a predetermined time from obtaining the input. This deterministic operation may result from the hardware-based solution of processing logic. The operations described may be performed without a CPU, other than during initialization of each lookup table.

Figure 4:
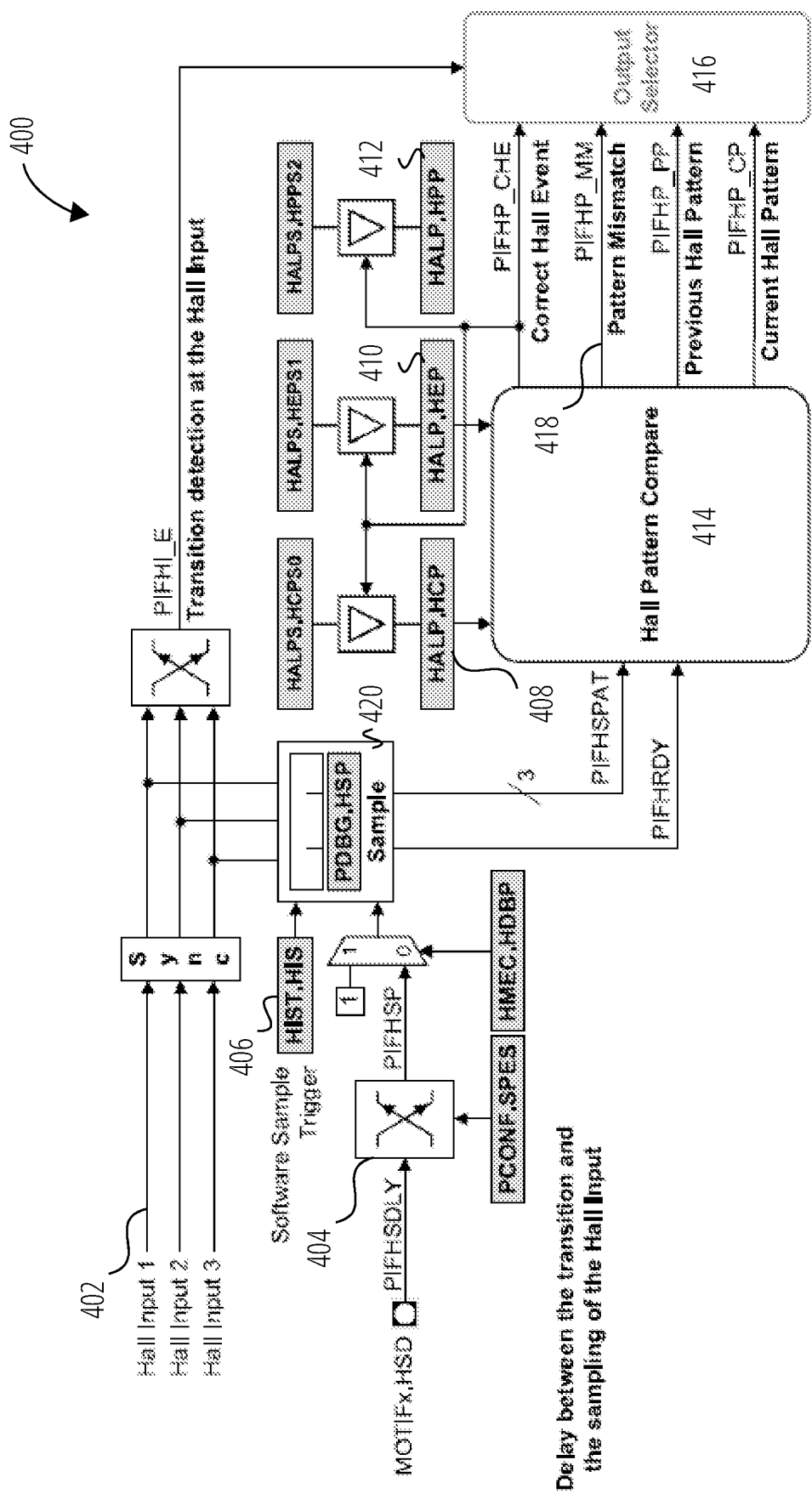
FIG. 4 shows a hall sensor motor control system in accordance with some embodiments.

FIG. 4 shows a hall sensor motor control system in accordance with some embodiments. The hall sensor motor control system 400 may include three major loops: detection of an update in the Hall inputs, delay between the detection and the sampling of the Hall inputs for comparison against the expected Hall Pattern, and the update of the PWM modulation pattern. The Hall inputs 402 may be directly connected to an edge detection circuitry through sampling logic 420. An event is generated at Transition Detection circuit 404. The event can be connected to one timer/counter/PWM (TCPWM) counter via trigger multiplexer that is controlling the delay between the edge detection and the next step on the Hall sensor mode, the sampling of the Hall Inputs. System 400 may correspond to a hardware-based motor control solution, such as, for example, motor control circuit 206 or processing logic 114 as described in other sections.

The signal used to trigger the sample of the Hall inputs can be active at the rising or falling edge (PCONF.SPES). The application software (e.g., a CPU) can also issue/request a sample of the Hall Inputs, by writing 1B into the HIST.HIS field 406, which may normally be used for start-up. When the sampling trigger is sensed, the Hall inputs are stored and compared against the Current Pattern, HALP.HCP 408, the Expected Hall Pattern, HALP.HEP 410 and the Previous Pattern HALP.HPP 412.

In some examples, the Previous Pattern comparison can be disabled. The edge detection circuit 404 generates an enable signal for sampling the hall inputs, PIFHSP and the sample logic 420 generates a pulse every time that new values are captured, PIFHRDY, that is used inside the hall pattern compare logic 414. The external sample trigger can also be bypass by setting the HMEC.HDBP bit field to 1B. This will trigger an immediate sample of the Hall Inputs after the filtering stage if a hall transition is detected. The Hall inputs 402 are also sampled as soon as the MOTIF start bit sees a rising edge. The software may check to start MOTIF after LPF output is valid.

When the sampled value matches the Expected Hall Pattern (e.g., stored as 410), an event/pulse is generated—Correct Hall event—to indicate that the sampled pattern matched the expected one. At the same time the values programmed into the shadow registers are loaded. The HALP.HCP[LSB] is linked to the Hall input 1, and the HALP.HCP[MSB] is linked to the Hall input 3 (the same is applicable for the HALP.HEP register). The update of the fields HALP.HCP, HALP.HEP and HALP.HPP can come from software. Software may write 1B to MCMS.STHR. When the sampled value matches the Current Hall Pattern (e.g., stored in register 408), the hall pattern compare may determine that a line glitch has occurred and no action is taken. Besides the comparison against the Current Hall Pattern, the hall pattern compare logic 414 may use a third comparison rule—the Previous Hall Pattern (stored in register 412). This rule can be enabled by setting the HMEC.HPPE bit field to 1B. With this comparison a wrong hall event is not generated if the sampled pattern matches the value programmed in the HALP.HPP. This is important when the motor is in a stand still position, which may impose that with inadequate torque, the previous hall pattern is sensed at the MOTIF inputs.

When the sampled value does not match any of the values (the current, expected and previous pattern), the hall pattern compare logic 414 may determine that a major error is has occurred and a 'Wrong Hall Event' signal may be generated. Every time that a sampled pattern leads to a wrong hall event or when it matches the current pattern or previous pattern (this one can be enabled or disabled) a 'Pattern Mismatch' event 418 may be generated and can be forward to one of the module output pins via the Output Selector 416.

Figure 5:
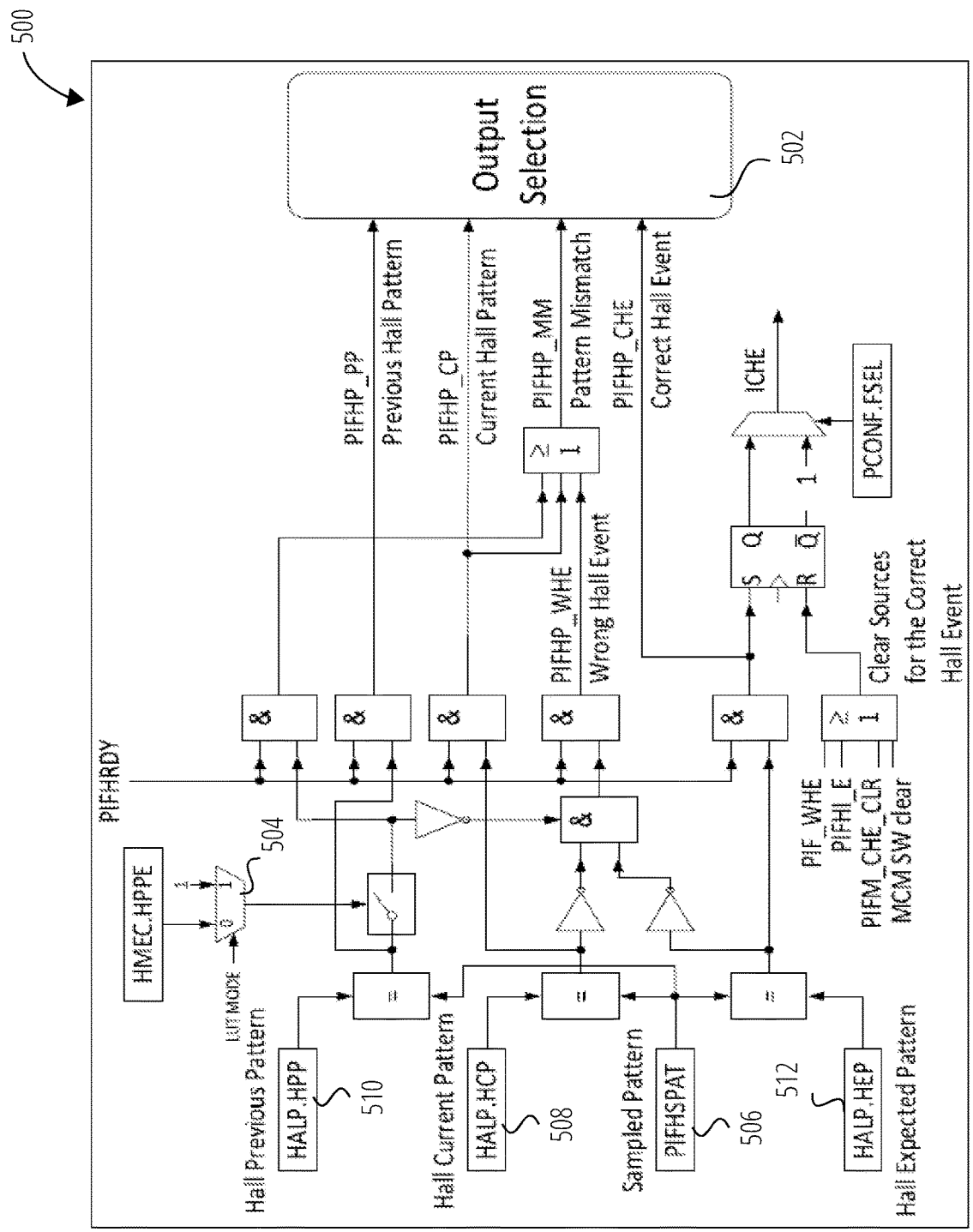
FIG. 5 shows an example of a hall compare logic block, in accordance with some embodiments.

FIG. 5 shows an example of a hall compare logic block, in accordance with some embodiments. The hall compare logic 500 may include an electronic circuit configured as shown, to receive the various inputs (e.g., the Hall Previous Pattern, the Hall Current Pattern, the Sampled Pattern, and the Hall Expected Pattern), and then direct signals to an output selection block 502.

In some examples, hall compare logic 500 and output selection block 502 may correspond to hall pattern compare 414 and output selector 416.

Hall compare logic 500 may operate in Look-up Table (LUT) Mode based on control of register 504. This mode aims to reduce CPU load for typical Motor Control phase commutation in a semi-autonomous way. The lookup table (LUT) mode is a fully hardware-based feedback control loop, which may be assisted by software (e.g., to provide values to LUTs on initialization). When the motor runs in the same direction, hall compare logic 500 and output selection block 502 may take full control of a Multi-channel pattern output (e.g., a PWM commutation pattern).

The Output pattern may be taken from a pre-loaded LUT (e.g., PWM lookup table 118), which may be initialized by software (e.g., a CPU). When motor changes direction, the system may be stopped and the LUTs (e.g., motor position lookup table 116, PWM lookup table 118) may be re-initialized through software. The system may resume again. The LUTs may be initialized by populating values in the memory (e.g., one or more registers) of the LUTs where these values may define the values and sequence of a motor position (e.g., motor position lookup table 116) or the values and sequence for the corresponding PWM commutation pattern (e.g., PWM lookup table 118).

Motor position lookup table 116 may also be referred to as Hall LUT (HLUT) or input LUT, and PWM lookup table 118 may also be referred to as Modulation LUT (MLUT) or output LUT. HLUT may contain the Hall input pattern which gets loaded by software to HALP registers, and MLUT may contain the output PWM modulation pattern which gets loaded to MCM.MCMP register. In some examples, HLUT comprises 3x6 bits. In some examples, MLUT comprises 32x6 bits.

As shown, the sampled pattern 506 may be compared to stored motor positions—the previous pattern 510, the expected pattern 512, and the current pattern 508. Depending on the comparison results, output selection block 502 generates a PWM output or fault response, or both.

Figure 6:
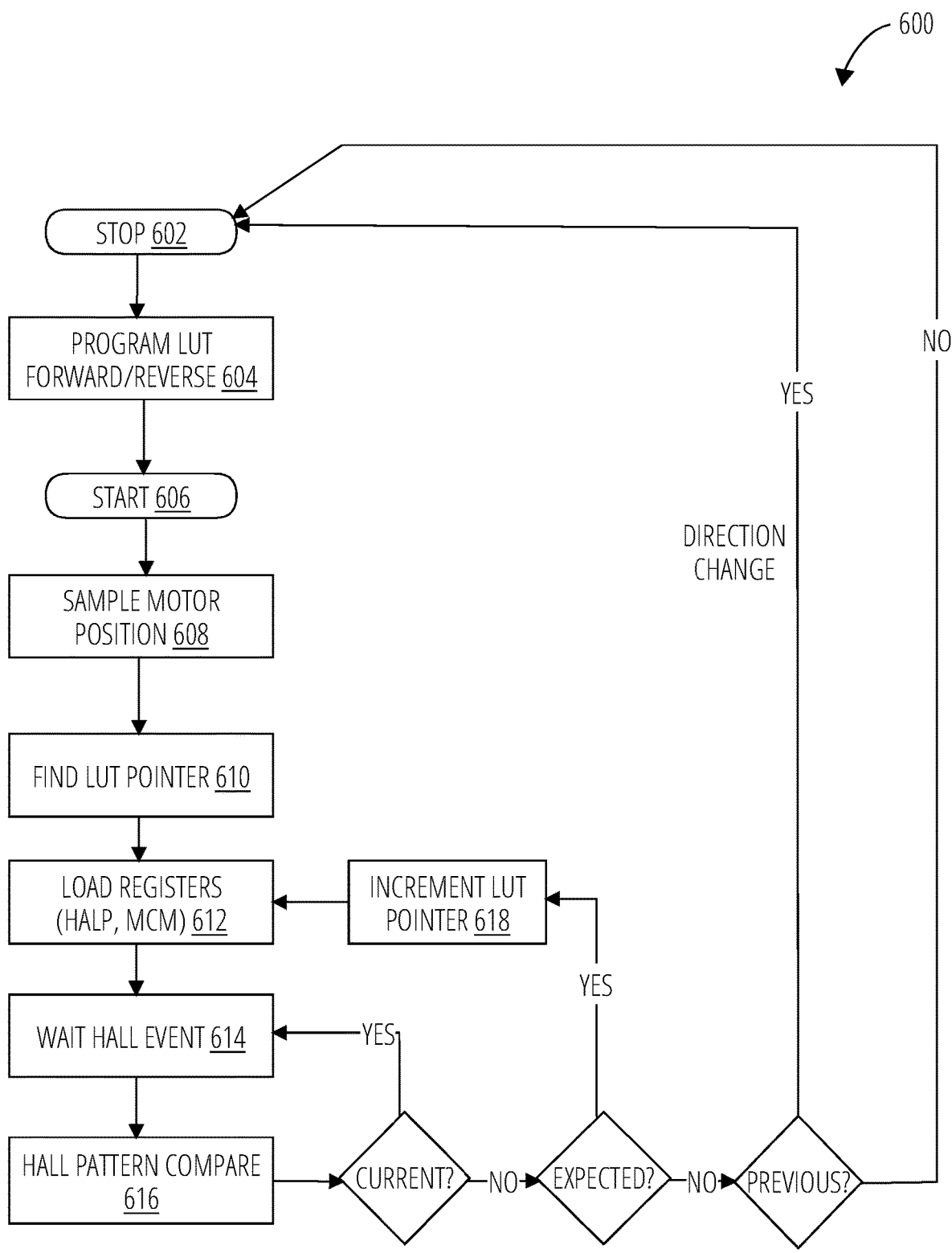
FIG. 6 shows a flow diagram of performing hardware-based motor control with lookup tables, in accordance with some embodiments.

FIG. 6 shows a flow diagram of performing hardware-based motor control with lookup tables, in accordance with some embodiments. The flow diagram may be performed by processing logic such as processing logic 114. Although the processing logic is a hardware-based solution (e.g., an electronic circuit, a non-CPU electronic circuit) that performs the operations 600, software may play a role, for example, for initialization or other control inputs.

At block 602, processing logic stops—it is not actively sampling hall inputs and generating PWM modulation pattern output. At block 604, the LUTs (e.g., motor position lookup table 116 (HLUT) and pwm lookup table 118 (MLUT)) are programmed with values. HLUT and MLUT may be initialized when processing logic is in a stopped state. Writing into both LUTs while processing logic is started may lead to incorrect behavior. The LUTs are loaded with either a forward pattern or a reverse pattern, depending on the desired motor direction. The pattern is stored in the LUTs independently from motor position. The processing logic detects the current motor position and uses the respective LUTS to load the proper hall pattern and modulation pattern. Hall pattern may also be referred to as a motor position that corresponds to a given sample of hall input values. The HLUT and MLUT may share the same hardware pointer for data extraction. Software may initialize the HLUT and MLUT with aligned values, so that the shared pointer provides the proper relationship between the HLUT and the MLUT. A wrong programming might lead to incorrect behavior. For example, if current motor position matches HLUT (x), the output modulation needs to locate in MLUT (x) with the same index. Software may initialize the values in the LUTs (which may each comprise a circular buffer) so that the indices of the respective buffers are aligned. For example, each LUT circular buffer may be populated in clockwise direction over 6 addresses, 0 to 5. The HLUT is populated so that it does not have repeated values. All six values are unique. If the current pattern is stored in HLUT (x) then, expected pattern is located in HLUT (x+1) and the previous pattern is located in HLUT x-1. The same applies for MLUT.

At block 606, processing logic may start—it may begin reading Hall inputs and generate corresponding PWM modulation pattern outputs.

At block 608, processing logic automatically samples Hall inputs when MOTIF is started and Hall mode is enabled. processing logic obtains the current motor position based on the sampled Hall inputs. The motor position sample may be available two clock cycles after MOTIF module is started and with LUT mode enabled.

At block 610, processing logic may find the LUT pointer. The LUT pointer may be a value (e.g., stored in a register) that indicates a position in the HLUT, the MLUT, or both. After the hall sample, processing logic compares the current motor position (available from block 608) against all six HLUT values (e.g., in a parallel comparison). processing logic may set the LUT pointer to correspond to the address which content matches the current motor position. Only one of the six comparisons is expected to be valid, because all HLUT values are initialized as unique values. If all six HLUT values differ from the motor current position, processing logic may generate a pattern mismatch event and stop. The pattern mismatch event can be used by software to load a modulation fault safe pattern. The processing logic may generate an interrupt.

The LUT address pointer "PTR" which corresponds to current pattern is updated and can be accessible via software through a register. Valid values are 0, 1, 2, 3, 4, and 5. Values 6 and 7 may be invalid. Block 610 may be executed at the starting phase after processing logic is enabled, but not at other times. The pointer is not incremented at this stage.

At block 612, processing logic automatically performs a shadow transfer to load HALP and MCM registers (e.g., see FIGS. 4 and 5) with the LUT pointer index. Output Modulation pattern may consist of a 32-bit output. This can be used to modulate up to 8 different TCPWM channels simultaneously. After the Correct Hall Event is detected, a delay can be generated between this detection and the update of the Multi-Channel pattern. A delay for the update of the Multi-Channel pattern can be controlled directly by a TCPWM counter. The trigger that indicates that the delay is finished may be mapped to an input. Software can also select the active edge for the trigger. The delay insertion can be bypassed by setting a field. Another field may select the source that enables an update of the multi-channel pattern. When set to 1B, the Multi-Channel pattern can be updated after the software has written a 1B into the field. After the update delay (if enabled), the Multi-Channel pattern may be synchronized with the PWM signal. When the configured edge is detected in this signal, then the new multi pattern is applied at the outputs from the MLUT.

At block 614, processing logic waits for a hall sensor input. When a sampling trigger is sensed, the Hall inputs are stored and compared against the current pattern, (e.g., HALP.HCP), the expected pattern, (e.g., HALP.HEP) and the previous pattern (e.g., HALP.HPR), as shown in FIG. 5.

At block 616, processing logic performs a comparison of the hall input to the current, expected, and the previous patterns.

If the hall input (motor control position) is equal to the expected pattern, processing logic runs freely, and next values from LUT are loaded to the HALP registers. Output modulation may be set as well, and processing logic may proceed to block 618.

If the hall input is equal to the current pattern, processing logic may fun freely without changing values of the LUTs. No action need be taken; the output modulation may be left alone to maintain its current value. The processing logic may proceed to block 614 and wait for the next hall event.

If the hall input is equal to the previous pattern, processing logic may perform a hardware stop, and a signal may be provided to software (e.g., a CPU) to indicate a motor direction change. Output modulation registers may be set to maintain its current value, and processing logic may proceed to block 602.

If the hall input is not the current, previous, or expected pattern, then processing logic may generate a fault (e.g., an interrupt) to software, set the output PWM modulation pattern to a safe pattern, or both, and proceed to block 602.

At block 618, if the correct hall event is decoded (e.g., the hall input is as expected), a LUT pointer (PTR) or pointers are incremented by 1. In some examples, PTR is expected to point to the current hall pattern. In some examples, PTR may be equal to the current pattern, PTR+1 may be the expected pattern, and PTR-1 may be the previous pattern. Depending on the management of the pointer, other relationships between PTR and the current pattern, expected pattern, and previous pattern may be possible. Software may access the current pattern through a processing logic register. Valid values for the current pattern may include 0, 1, 2, 3, 4, and 5. Invalid values may include 6, 7. This operation may be performed every time a correct hall event is detected.

These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus.

Unless specifically stated otherwise, terms such as "sending", "storing", "obtaining", "determining", "analyzing", "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed (e.g., programmable logic).

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component may be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 110, sixth paragraph, for that unit/circuit/component. Additionally, "configured to" or "configurable to" may include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A system comprising an electronic circuit, configured to:
   obtain an input comprising one or more hall sensor readings;
   determine a current motor position based on the input and a first lookup table;
   determine a desired motor position based on the first lookup table on the current motor position;
   determine a pulse width modulation (PWM) commutation pattern based on the desired motor position and a second lookup table; and
   output the PWM commutation pattern within a predetermined time from obtaining the input.

2. The system of claim 1, wherein the electronic circuit is further configured to detect that the current motor position is in fault, in response to the current motor position not matching a last sensed motor position, or not matching a motor position that is directly adjacent to the last sensed motor position.

3. The system of claim 2, wherein the electronic circuit is further configured to, in response to detecting the fault, output a fault signal to a central processing unit (CPU) within the predetermined time.

4. The system of claim 2, wherein the electronic circuit is further configured to, in response to detecting the fault, output a safety PWM commutation pattern that is not included in the second lookup table, within the predetermined time.

5. The system of claim 4, wherein the electronic circuit further comprises programmable memory that assigns a value to the safety PWM commutation pattern.

6. The system of claim 1, wherein the PWM commutation pattern comprises at least six PWM outputs.

7. The system of claim 1, wherein the electronic circuit further comprises programmable memory that assigns values to the first lookup table and the second lookup table.

8. The system of claim 1, wherein the first lookup table and the second lookup table are circular lookup tables.

9. The system of claim 1, wherein determining the desired motor position comprises incrementing an index of the first lookup table to obtain the desired motor position.

10. The system of claim 1, wherein the system includes a PWM timer, the PWM commutation pattern is output to the PWM timer, and the PWM timer outputs a plurality of PWM outputs according to the PWM commutation pattern.

11. A method, performed by an electronic circuit, comprising:
    obtaining an input comprising a plurality of hall sensor readings;
    determining a current motor position based on the input and a first lookup table;
    determining a desired motor position based on the first lookup table on the current motor position;
    determining a pulse width modulation (PWM) commutation pattern based on the desired motor position and a second lookup table; and
    outputting the PWM commutation pattern within a predetermined time from obtaining the input.

12. The method of claim 11, further comprising detecting that the current motor position is in fault in response to the current motor position not matching a last sensed motor position, or not matching a motor position that is directly adjacent to the last sensed motor position.

13. The method of claim 12, further comprising in response to detecting the fault, outputting a fault signal to a central processing unit (CPU) within the predetermined time.

14. The system of claim 12, further comprising in response to detecting the fault, outputting a safety PWM commutation pattern that is not included in the second lookup table, within the predetermined time.

15. The system of claim 14, comprising programmable memory that assigns a value to the safety PWM commutation pattern.

16. A microcontroller unit (MCU), comprising a central processing unit (CPU) and a separate electronic circuit, the electronic circuit configured to:
    obtain an input comprising one or more hall sensor readings;
    determine a current motor position based on the input and a first lookup table;
    determine a desired motor position based on the first lookup table on the current motor position;
    determine a pulse width modulation (PWM) commutation pattern based on the desired motor position and a second lookup table; and
    output the PWM commutation pattern within a predetermined time from obtaining the input.

17. The MCU of claim 16, wherein the electronic circuit is further configured to detect that the current motor position is in fault, in response to the current motor position not matching a last sensed motor position, or not matching a motor position that is directly adjacent to the last sensed motor position.

18. The MCU of claim 17, wherein the electronic circuit is further configured to, in response to detecting the fault, output a fault signal to a central processing unit (CPU) within the predetermined time.

19. The MCU of claim 17, wherein the electronic circuit is further configured to, in response to detecting the fault, output a safety PWM commutation pattern that is not included in the second lookup table, within the predetermined time.

20. The MCU of claim 19, wherein the electronic circuit further comprises programmable memory that assigns a value to the safety PWM commutation pattern.

* * * * *